United States Patent [19]

Wheeler

[11] Patent Number: 5,309,755
[45] Date of Patent: May 10, 1994

[54] PROFILOMETER STYLUS ASSEMBLY INSENSITIVE TO VIBRATION

[75] Inventor: William R. Wheeler, Saratoga, Calif.
[73] Assignee: Tencor Instruments, Mountain View, Calif.
[21] Appl. No.: 955,507
[22] Filed: Oct. 2, 1992
[51] Int. Cl.⁵ .............................................. G01B 7/28
[52] U.S. Cl. .................................. 73/105; 33/551; 33/558; 33/558.4
[58] Field of Search ................... 73/105, 104; 324/690; 33/521, 546, 551-554, 558, 558.01-558.09, 558.1-558.5, 561

[56] References Cited

U.S. PATENT DOCUMENTS

| | | | |
|---|---|---|---|
| 2,240,278 | 4/1941 | Abbott | 73/105 |
| 2,460,726 | 2/1949 | Arndt, Jr. | 73/105 |
| 2,691,887 | 10/1954 | Rinker | 73/105 |
| 2,935,681 | 5/1960 | Anderson | 324/671 |
| 3,546,929 | 12/1970 | Bergson | 73/105 X |
| 4,103,542 | 8/1978 | Wheeler et al. | 73/105 |
| 4,295,092 | 10/1981 | Okamura | 73/105 X |
| 4,377,911 | 3/1983 | Iida et al. | 33/561 |
| 4,389,786 | 6/1983 | Sakata et al. | 33/561 |
| 4,391,044 | 7/1983 | Wheeler | 33/561 |
| 4,560,924 | 12/1985 | Nordberg | 73/105 X |
| 4,574,625 | 3/1986 | Olasz et al. | 73/105 |
| 4,669,300 | 6/1987 | Hall et al. | 73/105 |
| 5,193,384 | 3/1993 | Foley et al. | 73/105 |
| 5,208,994 | 5/1993 | McMurtry et al. | 33/561 |

FOREIGN PATENT DOCUMENTS

| | | | |
|---|---|---|---|
| 372690 | 6/1990 | European Pat. Off. | 73/105 |
| 977463 | 6/1966 | Fed. Rep. of Germany | 73/105 |
| 1905538 | 8/1970 | Fed. Rep. of Germany | 73/105 |
| 260982 | 10/1988 | Fed. Rep. of Germany | 73/105 |

OTHER PUBLICATIONS

Tencor Instruments, "Actual Geometric Considerations of Surface Profilers", Nov. 1983, 3 pages.

Primary Examiner—Tom Noland
Attorney, Agent, or Firm—Schneck & McHugh

[57] ABSTRACT

A stylus profilometer having a counterbalanced stylus with a motion transducer using a vane moving between parallel, spaced-apart, conductive plates which damp the motion of the vane by means of trapped air. The vane forms an electrode with the plates so that the combination is a pair of capacitors in a balanced bridge arrangement. Motion of the stylus causes an unbalance of the bridge indicative of the extent of stylus motion. A lever arm associated with the stylus has a tip influenced by a magnetic field which biases the stylus or controls force on a surface to be measured. The entire assembly has a very low moment of inertia to reduce the effects of vibration on the stylus and thereby increase resolution of the device and reduce damage to the substrate.

13 Claims, 2 Drawing Sheets

PROFILOMETER STYLUS ASSEMBLY INSENSITIVE TO VIBRATION

TECHNICAL FIELD

The invention relates to instruments for measuring profiles of surface features of a patterned semiconductor wafer or measuring fine texture on soft substrates.

BACKGROUND ART

Profiling instruments were first developed in the 1930's for the purpose of characterizing surfaces in terms of roughness, waviness and form. In recent years, they have been refined for precise metrology in the measurement and production control of the thin film artifacts which are the building blocks of semiconductor devices. As the semiconductor industry has progressed to smaller dimensions with each new generation of product, the need for more sensitive and precise profiling instruments has grown. As artifacts become smaller, a smaller radius stylus must be used to fully resolve them. But a smaller radius produces higher contact pressure and necessitates use of lower stylus force. The use of very low stylus force renders the instrument more vulnerable to noise generation from roughness of the measured surface and also from environmental sources of vibration. The presence of noise in the output reduces the effective sensitivity of the instrument and compromises the fidelity of its traces. Fidelity is also lost whenever the ratio of stylus pressure to surface yield strength rises to the degree that plastic deformation of the surface occurs and detail of the surface variations is obliterated. Reduction of stylus force is the only solution to this problem.

In U.S. Pat. No. 4,103,542 Wheeler et al., assigned to the assignee of the present invention, disclose a counterbalanced stylus arm, pivoted about a bearing, in which stylus force may be adjusted by moving the counterbalance. Force is measured using a linear variable differential transformer having a core associated with the stylus arm and a coil, through which the core moves, supported independently of the arm. In U.S. Pat. No. 4,391,044 Wheeler discloses a similar stylus arm supported for linear scanning.

It is evident that operation of profilers at very low stylus force is desirable. The present state of the art in commercial profilers allows operation down to 1.0 mg. of force. However, a relatively quiet environment is necessary for good results at that force and such conditions are not always available in the users environment. What is needed is a reduced reaction of the stylus/sensor assembly to the vibration or shock energy pulses which reach it from whatever source.

An object of the invention was to devise a stylus assembly for a profilometer with improved vibration and shock insulation properties.

SUMMARY OF INVENTION

The above object has been achieved in a profilometer stylus assembly which reduces the effects of vibration and shock energy pulses by means of a substantial decrease in the moment of inertia of the assembly. For, as an energy pulse comes to the stylus arm structure, it will generate an accelerating force which will tend to raise the stylus from the sample surface either at the leading edge of the pulse or upon the rebound if the accelerating force exceeds the set stylus force. The acceleration force developed is in proportion to the moment of inertia of the stylus arm structure, hence its reduction allows the use of lower stylus force.

Conventional practice in existing designs is to locate the measurement sensor, sometimes a core working with a coil, close to the stylus on a pivoted stylus arm. A counterweight is frequently employed on the opposite end of the arm to achieve a static balance. This design approach assures that the sensor will precisely track the stylus motion and also that some momentum effects are avoided when a motion pulse is introduced through the stylus arm pivot.

Contrary to standard designs, the stylus support arm and the measurement sensor of the present invention are in opposed positions about the pivot. A vane, supported by the pivot, opposite the stylus, moves in air between two larger parallel capacitor plates. The trapped air between the plates damps the motion of the vane, thereby providing clamping of large stylus motions, while the two plates with the vane form a differential capacitor for the measurement of motion. An important feature is that the moment of inertia about a rotational axis can be made very small. Mass reduction at a maximum distance from the pivot is most important.

BRIEF DESCRIPTION OF THE DRAWINGS

FIG. 5 a side view of a capacitor plate used in the profilometer stylus assembly shown in FIG. 1.

BEST MODE FOR CARRYING OUT THE INVENTION

Figure 1:
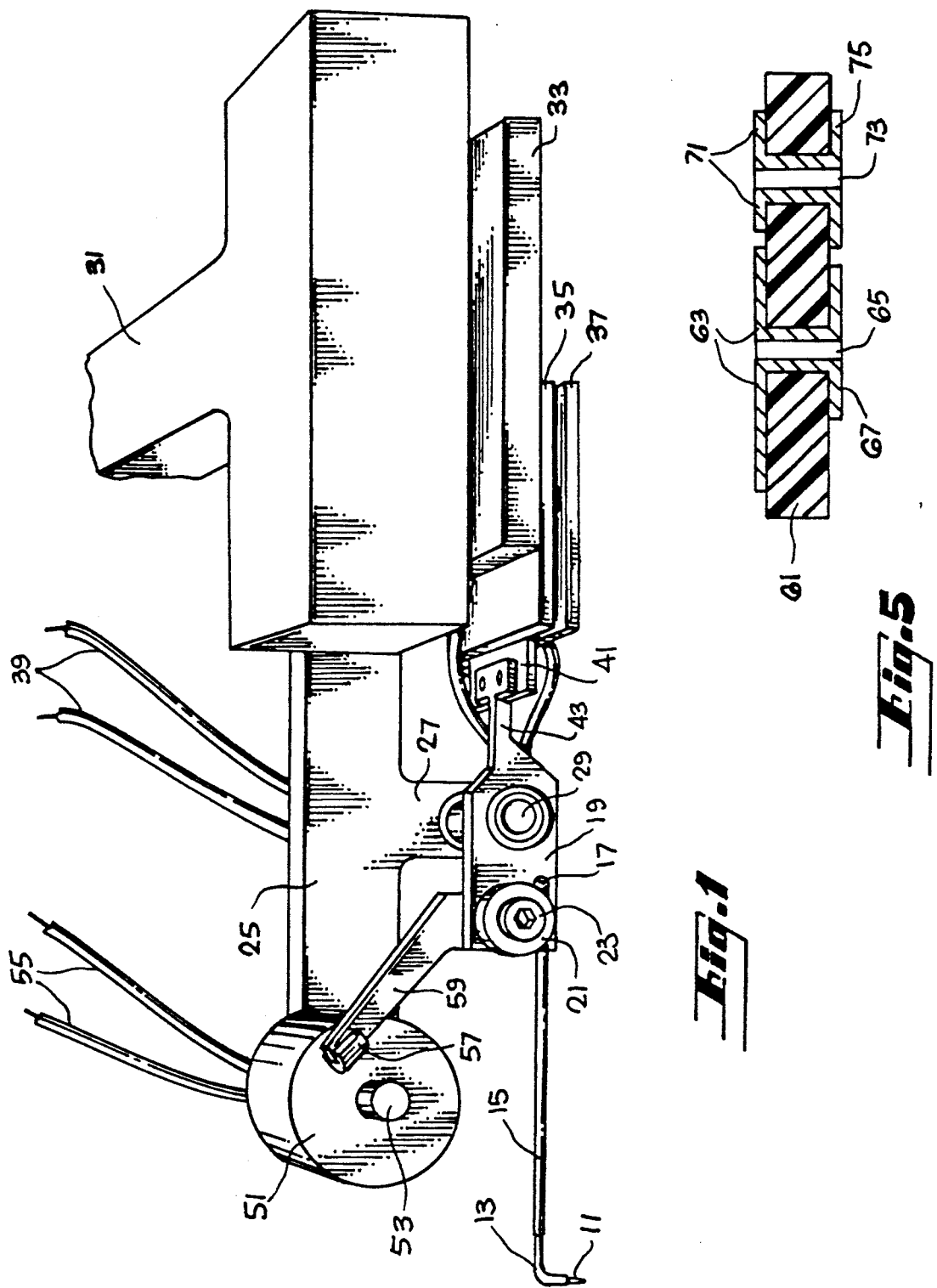
FIG. 1 is a side perspective view of a profilometer stylus assembly of the present invention.
Figure 2:
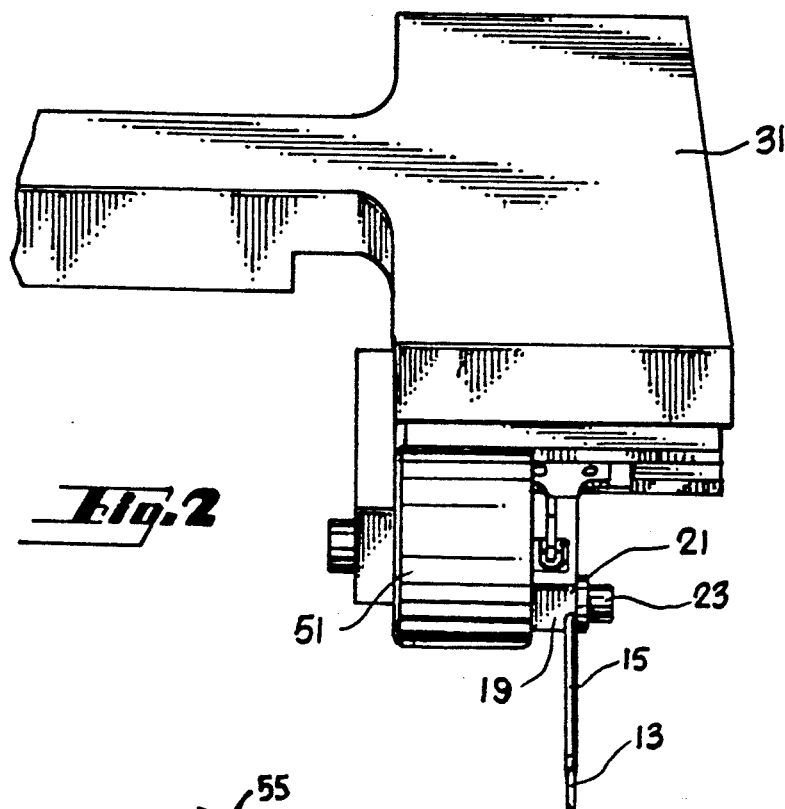
FIG. 2 is a front perspective view of the profilometer stylus assembly shown in FIG. 1.
Figure 3:
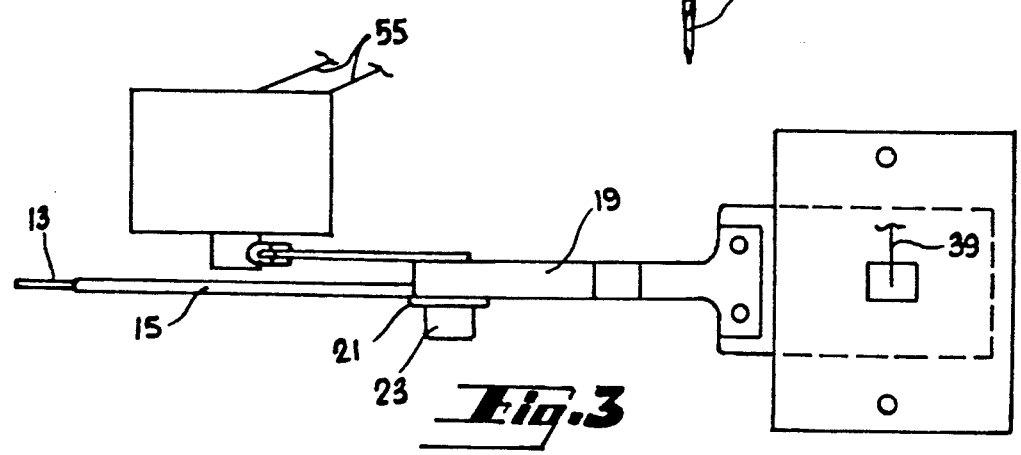
FIG. 3 is a top plan view of the profilometer stylus assembly shown in FIG. 1.

With reference to FIGS. 1-4, a diamond tip 11 having a radius of 0.01 mm. is adhered to an end of a slender stainless steel wire 13 which is bent at a right angle. The wire radius is about 0.25 mm. The diamond tip is adhesively mounted to a squared-off end of the wire, while the opposite end of the wire is inserted into a hollow aluminum arm 15 which has a length of approximately 2 cm and a wall inside radius of approximately 0.018 cm. The aluminum arm is sufficiently rigid that it will not bend when sensing step heights, yet sufficiently low mass that its moment of inertia can be kept low. The overall mass of the arm, wire and diamond tip should not exceed approximately 0.05 grams. Arm 15 fits into a groove 17 in pivot member 19. Washer 21 holds the arm in place in the groove 17, while a tiny screw 23 holds the washer in place against the wall of the pivot member 19. Support beam 25 has a downwardly extending column 27 to which a flexural pivot 29 is mounted, connecting the pivot member 19 to the column 27. In this manner, the aluminum arm 15 has a center of rotation about the flexural pivot 29. The flexural pivot 29 has enough torsion to lightly hold the stylus tip 11 downwardly against a surface to be measured. The entire mass on the stylus side of the pivot should not exceed 0.50 grams, including a lever described below.

A frame 31 may be connected to a tilt compensation or leveling mechanism as described in the prior patents to Wheeler. The underside of frame 31 supports a connector block 33 which acts as an elevational adjustment for a pair of spaced apart parallel capacitor plates 35 and 37. The spacing between the plates is approximately 0.7 mm., with an air gap between the plates.

Figure 4:
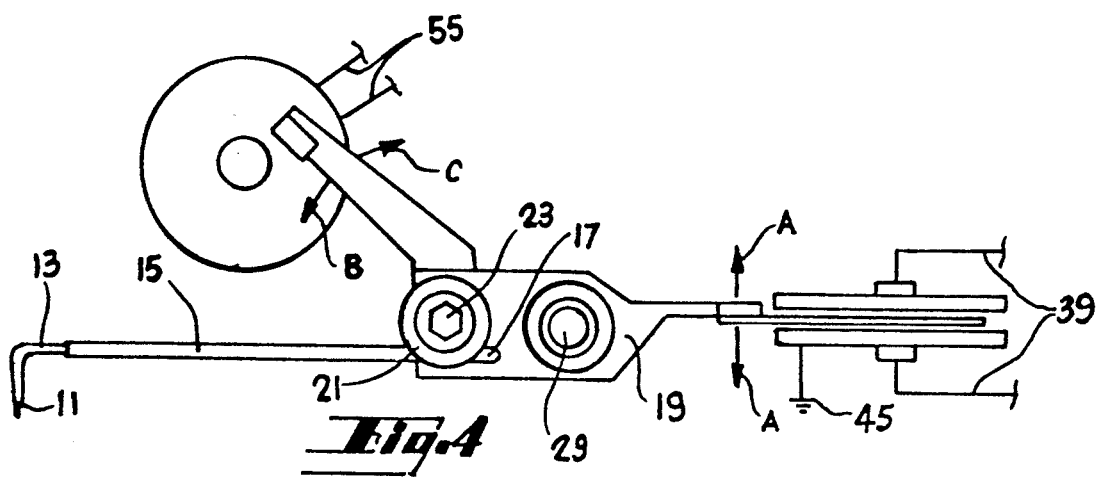
FIG. 4 is a side plan view of the profilometer stylus assembly shown in FIG. 1.

FIG. 5 shows the detail of a single capacitor plate. Such plate features a planar ceramic member 61 having a pair of conductive films which are silkscreened and then fired on the ceramic member to form a capacitor plate. The two plates are identical and so only one is shown. A conductive metal film 63 is shown extending through a via hole 65, in the ceramic member. The upper surface of the drawing represents the side of the plate facing the movable vane 41 in FIG. 1. The purpose of the via hole 65 is to provide electrical connection to a thin wire which is soldered on an outer surface solder pad and carries the signal from the capacitor plate to associated electronics. Wire 39 in FIG. 4 is such a wire. A second conductive metal layer 71 is in insulative relationship with respect to metal layer 63, but is also deposited on the ceramic member 61. The layer is plated through a second via 73 and has a bonding ring 75 on the backside of the capacitor plate. Layer 71 serves to terminate the shield of the wire which is terminated in via 65. The shield reduces electrical noise pickup.

Returning to FIGS. 1–4, a small insulative spacer, not shown, separates plate 35 from plate 37 and a screw fastens the two plates to frame 31. The area extent of the plates should be large enough to shield the vane from outside air, so that the vane experiences resistance to motion due to compression of air momentarily trapped between the closely spaced plates. A pair of electrical leads 39 is connected to the parallel plates, one lead to each plate. Between the parallel plates, a low mass of electrically conductive vane 41 is spaced, forming a capacitor with respect to each of the parallel plates 35 and 37. The range of motion of the vane, indicated by arrows A in FIG. 4, is plus or minus 0.16 mm. Moreover, vane 41, being connected to the pivot member 19, damps pivoting motion as the vane attempts to compress air between the parallel plates. This damping motion of the vane serves to isolate vibration and shock which may be transmitted into arm 15.

Vane 41 is connected to a paddle 43 which is the rearward extension of pivot member 19, opposite arm 15, serving to counterbalance the arm. The total mass of the vane, paddle and pivot member on the vane side of the pivot should not exceed about 0.6 g. The vane 41 is grounded so that a differential pair of capacitors may be formed with respect to parallel plates 35 and 37 with their respective electrical leads 39. Such a pair of capacitors may be arranged in a balanced bridge configuration. Movement of the vane between plates 35 and 37 upsets the balance of the bridge, with the change of capacitance indicative of stylus tip motion.

An electrical solenoidal coil 51 has a central ferromagnetic core 53 which becomes magnetized on application of current to the coil 51 by means of wires 55. The magnetized central ferromagnetic core 53 attracts a ferromagnetic tip 57 of a lever 59 having an end opposite the ferromagnetic tip which is affixed to the pivot member 19. By applying current to the wires 55 and magnetizing the core 53, magnetic force is exerted on the lever 59 causing a bias in the form of a rotation, indicated by the arrow B in FIG. 4. The lever 59 should be light weight, yet stiff so that the lever will not bend on the application of magnetic force.

In operation, the stylus tip 11 scans a surface to be measured, such as a patterned semiconductor wafer. Scanning may be achieved either by moving the frame 31 with respect to a fixed wafer position or alternatively moving the wafer, on an X-Y wafer stage with the position of the stylus fixed, or a combination of the two motions. In the latter instance, the stylus arm may be moved linearly in the X direction while the wafer is advanced in the Y direction after each lengthwise X direction scan. The stylus tip 11 is maintained in contact with the surface of the wafer by an appropriate bias applied through the coil 51 and the core 53 into the lever 59. The bias should be great enough to maintain contact, but yet not damage the surface being measured. Deflections of the tip 11 are caused by topological variances in the surface being measured and these are translated rearwardly through the pivot member 19 to the vane 41, but which resists undesirable large amplitude motion due to vibration because of the air displacement between the parallel plates 35 and 37. However, as the air is compressed and displaced, the vane 41 moves slightly causing a signal in electrical leads 39 reflecting a change in an electrical bridge circuit connected to these wires. At the end of a scan, the tip 11 is raised to protect it from damage in the event that a wafer is changed.

In building arm 15, wire 13 and tip 11, it is important to maintain the moment of inertia as small as possible. The mass-radius squared product should not exceed about 0.5 g-cm$^2$ and we have achieved a mass-radius squared product of 0.42 g-cm$^2$. The radius is measured with respect to the center of the spring pivot 29 to the furthest radial extent of the steel wire 13. A similar moment of inertia is calculated with respect to the vane 41 and the lever 59. The sum of the moments is termed the moment of inertia for the entire stylus arm. By maintaining a low moment of inertia, the stylus arm is less sensitive to vibration and greater resolution in profile measurements of thin films, and the like, may be achieved.

I claim:

1. A profilometer assembly comprising,
   an elongated stylus arm and counterbalance having a first end with a hard stylus mounted for contact with a substrate disposed below the arm and a second end, opposite the first end having a vane for motion between two parallel plates, the stylus arm having a pivot between the first and second ends, said parallel plates forming a stylus displacement measurement transducer with said vane, and
   a variable force member associated with the first end of the stylus arm for urging the first end into contact with said substrate.

2. The apparatus of claim 1 wherein said variable force member comprises a coil having a ferromagnetic core located a spaced distance from a lever connected to the first end of the stylus arm and having a ferromagnetic tip which can be magnetically actuated from a distance by said core.

3. The apparatus of claim 1 wherein said pivot is seated in a pivot member having a pair of opposed ends, one end supporting the stylus arm and the opposite end supporting said vane.

4. The apparatus of claim 1 wherein said parallel plates are disposed in air and have an areawise extent shielding the vane from outside air.

5. A profilometer assembly comprising,
   a measurement stylus mounted at the end of an arm for contact with a substrate, a pivot member having opposed forward and rearward sides and a central region therebetween mounted for turning on an axis defined from a relatively massive member, the pivot member supporting said arm on the forward side and a counterweight member on the rearward side, the counterweight including a force transducer having means for signaling motion of the pivot member, and means for adjustably biasing the forward side of the pivot member, thereby urging said stylus into contact with the substrate, having a coil spaced from said pivot member, a ferromagnetic core extending through the coil and a lever in magnetic communication with the core, transmitting force induced by the coil, to the forward side of the pivot member, the lever connected to the pivot member but spaced from said coil and core.

6. The apparatus of claim 5 wherein said arm, lever and vane have a rotational moment of inertia about the pivot member, said moment of inertia less than 0.5 gm-cm$^2$.

7. The apparatus of claim 5 wherein said pivot member has a rearwardly extending paddle, said vane being connected to said paddle.

8. A profilometer assembly comprising, a measurement stylus mounted at the end of an arm for contact with a substrate, a pivot member having opposed forward and rearward sides and a central region therebetween mounted for turning on an axis defined from a relatively massive member, the pivot member supporting said arm on the forward side and a counterweight member on the rearward side, the counterweight including a force transducer having means for signaling motion of the pivot member, and means for adjustably biasing the forward side of the pivot member, thereby urging said stylus into contact with the substrate.

wherein the force transducer means comprises a pair of spaced-apart, parallel plates with a movable vane therebetween, the vane connected to the rearward side of the pivot member whereby motion of the stylus member is transmitted through the pivot member to the vane.

9. The apparatus of claim 8, wherein said vane and said parallel plates form a bridge circuit.

10. A profilometer assembly comprising, a stylus arm for step-height measurements of a substrate, a pivot member supporting the stylus arm, a vane supported by the pivot member, rearwardly of the stylus arm, partially counterbalancing the stylus arm and having a mass-radius squared product in combination with the stylus arm not exceeding 0.5 gm-cm$^2$, wherein the vane moves in air between and generally parallel to two parallel plates, the air between the parallel plates damping motion of the vane, whereby the momentum of the arm is minimized in order to reduce damage to substrates.

11. The apparatus of claim 10, wherein the vane and said parallel plates define two capacitors arranged for differential sensing of the amount of turning of said pivot thereby sensing the deflection of said stylus arm.

12. The apparatus of claim 10 further comprising a solenoidal coil generating a magnetic field spaced a distance from said arm and a lever having one end connected to said pivot member and a free end having a ferromagnetic tip in communication with said magnetic field whereby said magnetic field can bias said arm relative the substrate.

13. The apparatus of claim 10, wherein said vane moves between two fixed parallel plate electrodes.

* * * * *